(12) United States Patent
Nyström

(10) Patent No.: US 7,938,048 B2
(45) Date of Patent: May 10, 2011

(54) BASIC BODY FOR TOOLS FOR CHIP REMOVING MACHINING

(75) Inventor: Leif Nyström, Järbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 248 days.

(21) Appl. No.: 12/277,348

(22) Filed: Nov. 25, 2008

(65) Prior Publication Data

US 2009/0155006 A1    Jun. 18, 2009

(30) Foreign Application Priority Data

Dec. 12, 2007 (SE) ..................... 0702759

(51) Int. Cl.
*B23B 37/00* (2006.01)
*B23P 15/32* (2006.01)

(52) U.S. Cl. .................. 82/50; 82/901; 407/11
(58) Field of Classification Search .......... 407/11; 82/50, 901; 173/73, 74; 279/20; 408/56
See application file for complete search history.

(56) References Cited

U.S. PATENT DOCUMENTS

| 3,028,772 | A |   | 4/1962  | Mossberg |
|-----------|---|---|---------|-----------------------|
| 3,259,403 | A | * | 7/1966  | Hjalsten et al. ........... 285/121.3 |
| 3,333,489 | A | * | 8/1967  | Mossberg ..................... 408/60 |
| 3,364,800 | A | * | 1/1968  | Benjamin et al. ......... 408/239 R |
| 3,443,819 | A | * | 5/1969  | Benjamin et al. ............... 279/20 |
| 3,561,299 | A | * | 2/1971  | Brisk et al. ...................... 408/59 |
| 3,791,660 | A | * | 2/1974  | Bostley .......................... 279/20 |
| 5,037,250 | A | * | 8/1991  | Kenny ............................. 408/57 |
| 5,402,696 | A | * | 4/1995  | Hecht et al. .................... 82/158 |
| 6,045,300 | A | * | 4/2000  | Antoun .......................... 407/11 |
| 7,371,034 | B2| * | 5/2008  | Clark .............................. 408/68 |
| 7,637,187 | B2| * | 12/2009 | Zurecki et al. ................. 82/1.11 |
| 2006/0029480 | A1 |   | 2/2006  | Stoll et al. |

* cited by examiner

Primary Examiner — Will Fridie, Jr.
(74) Attorney, Agent, or Firm — Drinker Biddle & Reath LLP

(57) ABSTRACT

A basic body for tools for chip removing machining, including an internal duct, and an inlet including a female thread for the supply of liquid to the duct. The female thread of the inlet is formed in a cage, which is inserted in a seating delimited by an endless inner wall as well as a bottom, the duct mouthing in the seating.

8 Claims, 2 Drawing Sheets

BASIC BODY FOR TOOLS FOR CHIP REMOVING MACHINING

This application claims priority under 35 U.S.C. §119 to Swedish Patent Application No. 0702759-2, filed on Dec. 12, 2007, which is incorporated by reference herein in its entirety.

FIELD OF THE INVENTION

The present invention relates generally to a basic body for cutting or chip removing tools of the type that includes an internal duct and an inlet surrounded by a female thread for supply of liquid to the duct.

BACKGROUND OF THE INVENTION

Although the invention is generally applicable to all types of such cutting tools, which are used for chip removing machining of, above all, workpieces of metal, the same is in practice based on problems, which are particularly difficult to master in connection with the manufacture of drills or drill bodies for hole-making purposes.

The cutting edges of drills requisite for the chip removal may either be permanently integrated in the drill body or be included in replaceable cutting inserts of a particularly hard material, such as cemented carbide. In order to evacuate the removed chips from the recessed hole, conventional short hole drills are formed with external chip flutes (usually two in number), which extend rearward from the cutting inserts or the cutting edges of the front tip of the drill toward the rear end. The chip flutes are delimited between bars, inside which ducts are formed for feed of liquid to the front end of the drill with the purpose of cooling and lubricating the cutting inserts. Because the chip flutes are deep and mutually spaced-apart by fairly thin webs in the center of the drill, the internal liquid ducts have to be located as near the envelope surface of the bars as possible, where the material is sufficiently sturdy to house the same.

A popular type of twist drill (i.e., a drill, the external chip flutes and bars of which extend helicoidally along the front part of the drill), which during operation is fixedly mounted in order to machine a rotating workpiece, is formed with two inlets to the internal liquid conduits, viz. a rear inlet, which mouths in the rear end surface of the drill body, and a side inlet, which mouths in the envelope surface, usually in a collar, which separates a front part of the drill from a rear part. In such a way, the user is offered the possibility of—depending on the existing machine equipment—engage the threaded hose or conduit connections of the machine to either the side inlet or the rear inlet, the unutilized inlet being closed by means of a likewise threaded plug. However, if a liquid-leading duct inside a tool body would be crossed or intersected by a threaded bore, an imminent risk of liquid leakage arises via the thread. For this reason, it has previously been necessary to manufacture drills of the type in question by assembling two parts, viz. a front part in which the bars and the liquid ducts are formed, as well as a rear part, in which the two inlets are formed and interconnected via a centrally running duct, which mouths in a hollow space with which the two liquid ducts of the front part can communicate after assembly of the two parts. The manufacture of the front part is carried out by drilling, in a cylindrical blank of steel, straight holes in order to form the two liquid ducts, preferably by pipe-drilling, and then by hot working turn the blank so that the ducts obtain a helix shape having the desired pitch. After that, grooves are milled having the same helix shape as the ducts, in order to form chip flutes. In a concluding step, the two parts are integrated with each other via a suitable metallurgical joint, e.g., a welded joint.

However, a disadvantage of twist drills, which are manufactured in the above-mentioned way, is that the completed drill may obtain inferior precision and varying tolerances, which leads to poor machining results. Therefore, in practice, it occurs too often that the finish-produced drills have to be discarded.

An entirely different type of twist drill, which rotate in order to machine fixedly mounted workpieces, lack side inlets, and are formed with liquid ducts, which mouth directly in the rear end of the drill body without having any threads. In such a way, the drill body can be manufactured in a solid design based on a blank, in which the two holes of the liquid duct can be pipe-drilled all the way between the front end and the rear one, after which the front part of the blank on one hand is turned in a heated state in order to give the ducts the desired helix shape, and on the other hand is machined by milling in order to form the external chip flutes. As a consequence of the fact that such drills can be manufactured from one single blank in a continuous piece, the completed drill obtains considerably better tolerances and performance than the previously described, two-part drill.

The present invention aims at obviating the respective disadvantages of previously known drill bodies or basic bodies and at providing an improved basic body of the tool.

An object of the invention to provide a basic body made with one or more liquid conduit ducts, in which the requisite inlet or inlets to the ducts optionally can be placed on suitable spots along the same without risk of liquid leakage between, on one hand, the female thread of the inlet, and on the other hand the male thread of a hose connection or a plug. It is also an object to provide a basic body having improved flexibility relating to the possibilities of connecting to the same different hose connections.

Another object is to provide exactly a drill body, which can be manufactured in one single solid piece and be formed with one or more inlets, which are threaded and in spite of this ensuring leakage-proof connection of hoses or plugs. Within the field of drills, an embodiment of the invention particularly aims at providing an improved twist drill having double, internal liquid feeding ducts and having optimal properties in respect of dimensional accuracy and performance.

Yet another object of the invention is to provide a basic body, which can be manufactured of a material, e.g., a composite material, which, in contrast to steel, is hard to form with threads.

SUMMARY OF THE INVENTION

The invention is based on forming the female threads of the liquid inlets in particular cages, which are mounted in seatings, against the insides of which the outsides of the cages seal. In such a way, it is ensured that liquid from, for instance, pipe-drilled ducts cannot leak out via the threaded joint between, on one hand, the female thread and on the other hand, the male thread of a hose connection or a sealing plug.

In an embodiment, the invention provides a basic body for tools for chip removing machining, including an internal duct, and an inlet including a female thread for the supply of liquid to the duct. The female thread of the inlet is formed in a cage, which is inserted in a seating delimited by an endless inner wall as well as a bottom, the duct mouthing in the seating.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
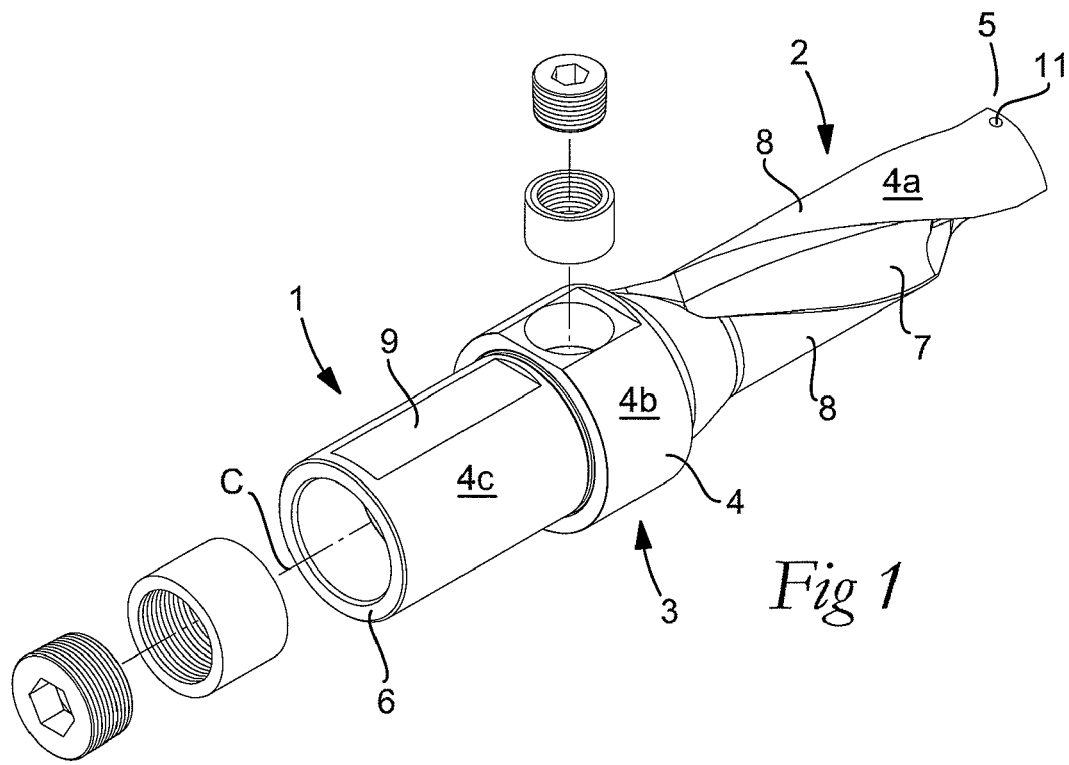
FIG. 1 is a perspective exploded view showing a basic body according to an embodiment of the invention exemplified in the form of a drill body, as well as two pairs of cages and sealing plugs for the same.

In the drawings, a drill body is shown in the form of a completed, usable drill, which is manufactured in one single solid piece of material, preferably steel, and includes a rear part 1, which is spaced-apart from a front part 2 via a collar 3. Similar to other drills, the drill body has an envelope surface in its entirety 4 designated as well as front and rear ends 5, 6, the last-mentioned one of which is in the form of a ring-shaped, plane surface, disposed perpendicularly to a geometrical center axis C, around which the drill body can be rotated. In the front end or the tip 5, there are cutting inserts or cutting edges (not visible) for the chip removal and hole making. More precisely, two cutting edges are included to which chip flutes 7 are connected, which separate two bars 8. In this case, when the tool is a twist drill, the bars 8 as well as the chip flutes 7, are helicoidal and extend rearward from the tip 5 approximately up to the collar 3. The envelope surface in its entirety designated 4 includes three different part surfaces, viz. a part surface 4a along the front part 2, a part surface 4b along the collar 3, as well as a part surface 4c along the rear part 1. In the last-mentioned part surface 4c, a plane surface 9 is formed in order to enable transfer of torque to the drill body or clamp the same, when the rear part 1 is mounted in a machine attachment.

Figure 2:
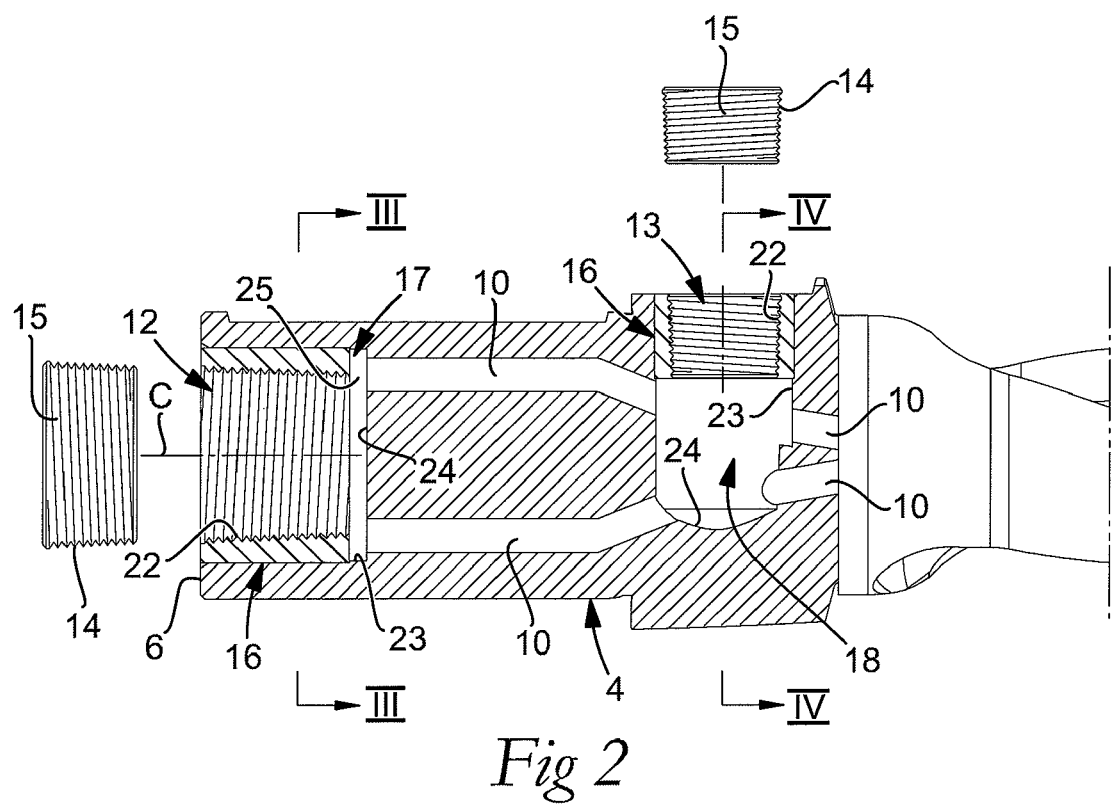
FIG. 2 is an exploded view shown partly in longitudinal section and partly in side view of the rear part of the drill body on an enlarged scale.

Inside the drill body, two liquid ducts 10 are formed, the rear portions of which are visible in FIG. 2 and the front portions of which extend through the bars 8 of the front part 2 of the drill body. More precisely, the ducts 10 extend up to outlets 11, one of which is visible in FIG. 1. To the ducts 10, liquid can in this case be supplied via two inlets 12, 13, inlet 12 opening in the rear end of the drill body, and inlet 13 opening in the envelope surface, more precisely in the part surface 4b, which is included in the collar 3. To these inlets, either a sealing plug 14 or a hose connection (not shown) could be coupled in order to afford the user the possibility of supplying the liquid either from behind or from the side, the unutilized inlet being closed by a plug. The sealing plugs as well as the hose connections are formed with male threads 15 intended to be screwed into female threads, which surround or delimit the inlets 12, 13. In order to ensure a good liquid seal, both types of threads are in a conventional way formed with a slight conicity.

According to an embodiment of the invention, the female thread of the individual inlet 12, 13 is formed in a cage, which in turn is inserted in a seating. Because the cages principally are made in one and the same way, although they have different dimensions, the same have been provided with one and the same reference designation 16, while the two seatings individually are designated 17 and 18, respectively. In the shown, embodiment, the cages as well as the appurtenant seatings have a rotationally symmetrical basic shape. More precisely, the individual cage 16 (see FIG. 5) is ring-shaped and delimited by, on one hand, an external, smooth surface 19, which in this case is cylindrical and has an outer diameter $OD_1$, and on the other hand two ring-shaped end surfaces 20, 21, which are disposed perpendicularly to the center axis of the cage. In the internal surface of the cage, a female thread 22 is formed, which, such as previously has been mentioned, has a slightly conical shape, something which entails that the internal, ring-shaped end surface 20 of the cage is somewhat wider than the outer end surface 21. The seating 17 as well as the seating 18 are delimited by, on one hand, an endless or rotationally symmetrical inner wall 23, and on the other hand a bottom 24. In both cases, the inner wall 23 is cylindrical and has a diameter $ID_1$, which corresponds to the outer diameter $OD_1$ of the cage in order to seal against the cylindrical outside 19 of the individual cage. In this connection, the cage may be fixed in the appurtenant seating in various ways, which however always should ensure a seal so that liquid cannot pass between the outside of the cage and the inner wall of the seating. Tests made have shown that the cage may be glued into the seating, but also other joints are possible, e.g., shrinkage fits.

The cage 16 is in practice manufactured of steel or another equivalent material, in which strong threads can be formed, in particular by turning.

Figure 5:
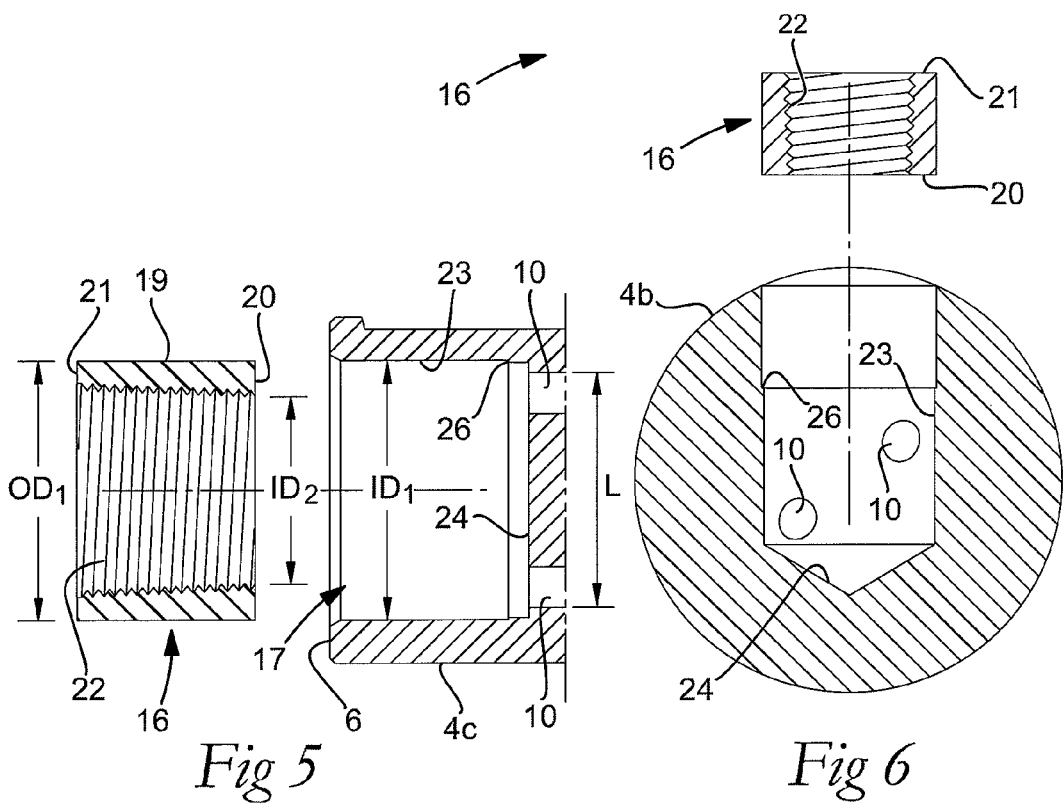
FIG. 5 is a detailed section showing the rear end portion of the drill body and a cage separated from the same.

As seen in FIGS. 2 and 5, the cage 16, which is mounted in the rear seating 17 of the drill body, is shorter than the proper seating. In such a way, a space or gap 25 arises between the inner end 20 of the cage and the bottom 24 of the seating (which bottom is plane and circular), in which space the ducts 10 open with full cross-sectional area. The two liquid ducts 10 also open in the seating 18, but in this case in the cylindrical inner wall 23 of the seating, more precisely in the space, which is formed between the inner end surface 20 of the short cage 16 and the bottom surface 24 of the longer seating. From this space in the seating 18, the ducts continue out in the bars 8 of the front part 2 of the drill body.

Figure 3:
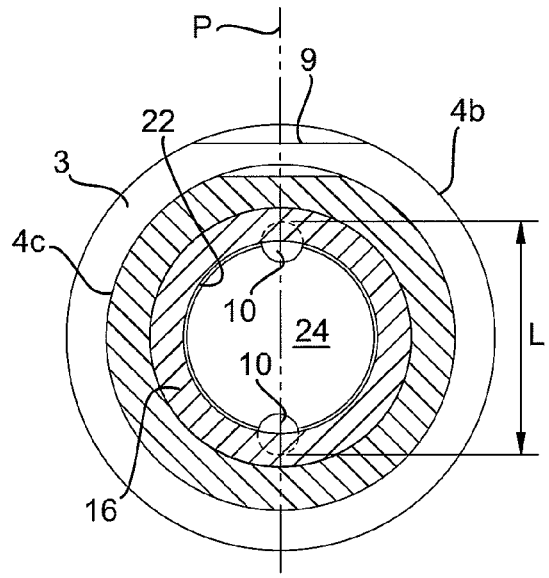
FIG. 3 is an enlarged cross section III-III in FIG. 2.
Figure 4:
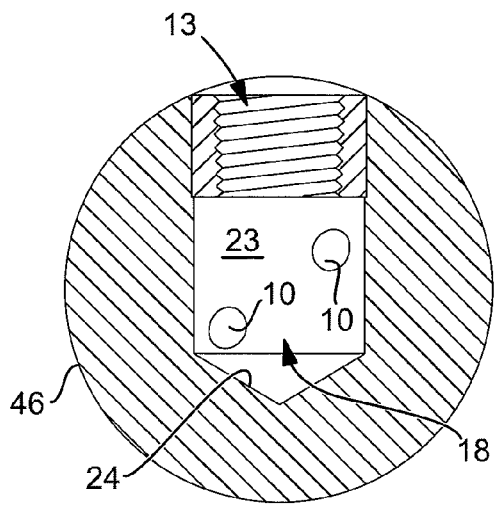
FIG. 4 is an enlarged cross section IV-IV in FIG. 2.

As seen in FIG. 3, the two ducts 10 in the rear part 1 of the drill body are mutually situated in a diametrical plane P and spaced-apart at a distance L as measured between the radially outer portions of the insides of the ducts. In FIG. 5, it is seen that the cage 16 has an outer diameter $OD_1$, which is somewhat greater than the distance L, which in turn is greater than the smallest diameter $ID_2$ of the female thread 22. Due to the space 25 between the cage 16 and the bottom 24 of the seating, the cage will however not block a free liquid flow into the ducts.

Figure 6:
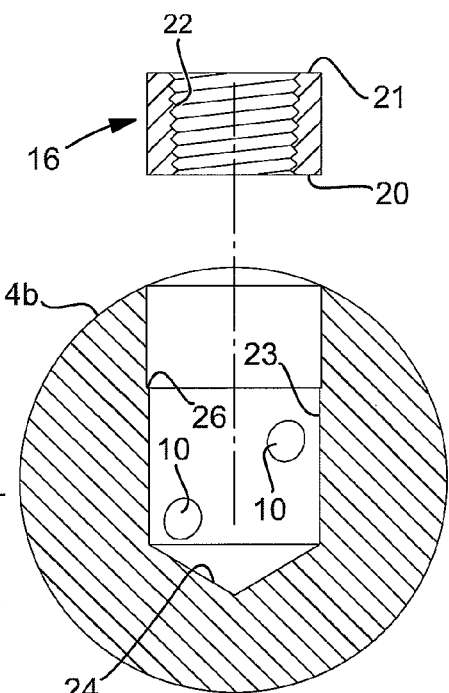
FIG. 6 is a cross section corresponding to FIG. 4, in which the cage is shown spaced-apart from the drill body.

In FIG. 5, it is also shown that a ring-shaped shoulder surface 26 is formed in the cylindrical inner wall 23 of the seating, more precisely in order to serve as a stop, which determines the inner end position of the cage in the seating. See also FIG. 6.

By forming the female threads of the inlets 12, 13 in cages or mountings of the type described above, no threaded bores need to intersect or cross the liquid feeding ducts 10 of the drill body. This affords in practice a plurality of advantages, one of which is that the ducts may be provided by pipe-drilling of one single piece of material. More precisely, the drill may be manufactured in the following way.

In a cylindrical blank, e.g., of steel, two parallel holes are drilled, suitably by pipe drills, which holes extend all the way between the front and rear ends of the blank, the holes being located fairly near the envelope surface of the blank in order to later end up in those parts of the bars 8, which contain much material. In the next step, the blank is heated and is clamped with the rear part thereof fixed in a fixture, after which the front part is turned so that the drilled holes obtain the desired helix shape. In the next step, when the blank has cooled, forming of the chip flutes 7 in the front part of the blank follows, something which may take place by milling and/or grinding, as well as formation of the seatings 17, 18 for the appurtenant cages, something which may take place by milling and/or drilling. After the hardening, the cages manufactured in another place are mounted in order to form a drill ready for use.

In the general application thereof to tool basic bodies, the invention affords the advantage that a thread-provided inlet to an internal duct of the basic body may optionally be placed in a suitable spot, without risk of liquid leakage in the threaded joint to, for instance, a hose connection or a plug. In addition, the invention affords substantial advantages in respect of the choice of material of the basic body. Thus, the basic body may be manufactured of a material, in which it is difficult or impossible to form strong threads. In other words, the cage having the female thread may be manufactured of steel or another equivalent material, while the basic body is manufactured of another material than steel, e.g., a composite material. In the application thereof to exactly drill bodies, the invention furthermore affords the advantage that the requisite liquid ducts may be pipe-drilled in a continuous blank irrespective of the number of ducts in the same, the completed drill body obtaining excellent properties in respect of dimensional accuracy and tolerances in comparison with such drills, which have to be assembled of two pre-machined parts.

While the invention has been disclosed with reference to certain preferred embodiments, numerous modifications, alterations, and changes to the described embodiments are possible without departing from the sphere and scope of the invention, as defined in the appended claims and their equivalents thereof. Thus, it is possible to apply the invention also to such basic bodies, which are not included in drills and which include another number of liquid conduit ducts than exactly two, e.g., only one. It is also applicable to drills having chip flutes and bars, which have another shape than exactly helicoidal, e.g., straight. It is even possible to manufacture the drill body or the basic body based on two different kinds of materials, viz. by metallurgically uniting two part bodies while forming an initial blank, which at a later stage is formed with through duct holes, chip flutes and seatings for the cages in the way described above. Generally, the invention may also be applied to any cutting tools other than exactly drills, e.g., milling cutter tools, turning tools, universal tools, etc. Accordingly, it is intended that the invention not be limited to the described embodiments, but that it have the full scope defined by the language of the following claims.

What is claimed is:

1. A drill body for chip removing machining, comprising:
   an envelope surface and front as well as rear ends between which a geometrical center axis extends;
   an internal duct extending from a front part toward the rear end; and
   an inlet including a female thread for the supply of liquid to the duct,
   wherein the female thread of the inlet is formed in a cage, which is inserted in a seating delimited by an endless inner wall as well as a bottom, the duct mouthing in the seating, and the seating opening in at least one of the rear end and the envelope surface of the drill body.

2. The drill body according to claim 1, wherein the cage and the drill body are manufactured of different materials.

3. The drill body according to claim 2, wherein the cage comprises steel.

4. The drill body according to claim 1, wherein the inlet cage is placed in a seating, which opens in the rear end, and extends in an extension of the duct.

5. The drill body according to claim 1, wherein the inlet cage is placed in a seating, which opens in the envelope surface and extends at an angle to the duct.

6. A drill body for chip removing machining, comprising:
   an envelope surface and front as well as rear ends between which a geometrical center axis extends;
   two internal ducts extending from a front part toward the rear end; and
   an inlet including a female thread for the supply of liquid to the ducts,
   wherein the female thread of the inlet is formed in a cage, which is inserted in a seating delimited by an endless inner wall as well as a bottom, the ducts mouthing in the seating,
   wherein the seating opens in the rear end and extends in an extension of the duct, and
   wherein the two ducts are spaced-apart from the center axis and at least in a rear part of the drill body are mutually situated in a diametrical plane, wherein the bottom of the seating has a circular contour shape and a diameter, which is greater than the greatest diametrical distance between the insides of the two ducts.

7. The basic body according to claim 6, wherein the cage has an inner diameter which is smaller than the greatest distance between the insides of the ducts, and is shorter than the seating such that, between the inner end of the cage and the bottom of the seating, a space is delimited, in which the ducts open with full cross-sectional area.

8. The drill body according to claim 1, wherein the inner end of the cage is pressed against a ring-shaped shoulder surface, which is axially spaced apart from the bottom of the seating.

* * * * *